United States Patent [19]

Sawaki

[11] Patent Number: 4,855,791
[45] Date of Patent: Aug. 8, 1989

[54] SHEET ROLL CARTRIDGE AND METHOD FOR LOADING THE SAME TO IMAGE RECORDING APPARATUS

[75] Inventor: Yukichi Sawaki, Gifu, Japan

[73] Assignee: Brother Kogyo Kabushiki Kaisha, Aichi, Japan

[21] Appl. No.: 198,183

[22] Filed: May 24, 1988

[30] Foreign Application Priority Data

May 29, 1987 [JP] Japan ................... 62-135377
May 29, 1987 [JP] Japan ................... 62-135378

[51] Int. Cl.$^4$ .................. G03B 27/32; G03B 27/52
[52] U.S. Cl. .................. 355/27; 346/107 R; 355/77; 430/138
[58] Field of Search ............. 355/27, 28, 77; 346/107 R, 108; 430/138

[56] References Cited

U.S. PATENT DOCUMENTS

| | | | |
|---|---|---|---|
| 4,399,209 | 8/1983 | Sanders et al. | 430/138 |
| 4,440,846 | 4/1984 | Sanders et al. | 430/138 |
| 4,737,822 | 4/1988 | Taniguchi et al. | 355/27 |
| 4,742,374 | 5/1988 | Yamamoto et al. | 430/138 X |
| 4,760,426 | 7/1988 | Taniguchi et al. | 355/27 |
| 4,783,683 | 11/1988 | Nagumo et al. | 355/27 |
| 4,785,332 | 11/1988 | Nagumo et al. | 355/27 |
| 4,797,710 | 1/1989 | Ishikawa | 355/27 |
| 4,799,085 | 1/1989 | Nagumo et al. | 355/27 |

Primary Examiner—Richard A. Wintercorn
Attorney, Agent, or Firm—Oliff & Berridge

[57] ABSTRACT

A sheet roll cartridge for accommodating a roll-type recording medium for used in an image recording apparatus which comprises exposure and pressure/development stations, and a method for loading the cartridge to the image recording apparatus. The sheet roll cartridge comprises a light-shieldable casing for accommodating the recording medium, the casing being formed with first and second openings for allowing the recording medium to path therethrough; and, recording medium loading means arranged in the light-shieldable casing for supplying the recording medium through the first opening to the image recording apparatus and withdrawing the recording medium through the second opening. The recording medium has a tail end portion provided with at least two separable connection portions to be separable from remaining part of the recording medium, and a distance between the connection portions being at least equal to or larger than a length of a sheet path starting from the first opening and ending at the second opening through the exposure and pressure/developing stations.

5 Claims, 1 Drawing Sheet

SHEET ROLL CARTRIDGE AND METHOD FOR LOADING THE SAME TO IMAGE RECORDING APPARATUS

BACKGROUND OF THE INVENTION

This invention relates to a sheet roll cartridge or patrone for accommodating a sensitive sheet which is in a form of roll-type continuous web and is coated with photosensitive material. The invention also relates to a method for loading the sheet roll cartridge to an image recording apparatus.

This type of sheet roll cartridge has been used in an image recording apparatus such as a photographic development apparatus or a microfilm reader printer. The recording apparatus as described above has been designed in such a manner that a photosensitive recording sheet is exposed with light which is reflected from or transmitted through an original, and then the light-exposed photosensitive recording sheet is developed to form an image thereon.

In the recording apparatus, prescribed chemical supplies are demanded for the development of the exposed photosensitive recording sheet, and therefore the development apparatus in the recording apparatus inherently provides complicated construction. In order to eliminate the complicated construction of the development apparatus, there has been recently proposed a photocopier using a photosensitive/pressure-sensitive recording sheet which is coated with photo-curable microcapsules.

More specifically, the photocopying technique of this kind are generally classified into a transfer type method disclosed in U.S. Pat. No. 4,399,209, and a self-contained type method disclosed in U.S. Pat. No. 4,440,846. According to the transfer type recording method, a microcapsule carrying sheet includes a substrate and microcapsules coated thereon. Each of the microcapsules contains a chromogenic material (dye precursor or color former) and a photosensitive material (photo-curable resin). On the other hand, a separate developer sheet includes a substrate and developer material coated thereon. Upon light exposure, curing of the photo-curable resin in the microcapsules occurs in light-exposed areas of the microcapsule layer. When the microcapsule layer and the developer material layer are in pressure contact with each other by means of pressure rollers, the microcapsules at unexposed parts in remaining parts of the microcapsules layer are ruptured. As a result, the chromogenic material flowed from the ruptured microcapsules is reacted with the developer material for forming a visible image on the developer sheet in conformance with an original image.

According to the self-contained type method, an encapsuled chromogenic material and a developer material are co-deposited on one surface of a single substrate as one layer or as two contiguous layers, so that a visible image is provided on the single sheet by the reaction of the chromogenic material with the developer material upon rupture of the non-cured microcapsules.

Therefore, a simplified developing apparatus in the photocopier can be provided if the photosensitive/pressuresensitive recording sheet as described above is used in the photocopier. However, the microcapsules on the photosensitive/pressure-sensitive recording sheet are easily ruptured upon application of external force, and therefore a particualar attention must be drawn to the photosensitive/pressure-sensitive recording sheet when it is intended to be handled. Furthermore, when a cut-type photosensitive/pressure-sensitive recording sheet is used, there are disadvantages in that it is difficult to load the cut sheet to the photocopier, and a recording sheet transferring system in the photocopier must has a complicated construction.

In order to overcome the above disadvantages attendant to the employment of the cut sheet, a roll-type photosensitive/pressure-sensitive recording sheet can be used instead of the cut sheets. However, this roll-type of recording sheet has another disadvantage when it is loaded into the recording apparatus. That is, a leading end portion of the recording sheet must be manually drawn out and is inserted into an exposure portion and a pressure/fixing portion in the recording apparatus, and therefore much labor is needed.

SUMMARY OF THE INVENTION

An object of this invention is to overcome the abovedescribed drawbacks and to provide an improved roll-type photosensitive/pressure sensitive recording sheet which is accommodated in a sheet roll cartridge.

Another object of this invention is to provide a sheet roll cartridge for accommodating a recording sheet, which cartridge eliminates a labor of manually inserting the leading end portion of a recording sheet into a recording apparatus and can fasilitate loading of the sheet onto the image recording apparatus.

Still another object of this invention is to provide a method of loading the above sheet roll cartridge to the recording apparatus.

These and other objects are achieved by a sheet roll cartridge comprises a light-shieldable casing for accommodating the recording medium, the casing being formed with first and second openings for allowing the recording medium to path therethrough; and, recording medium loading means arranged in the light-shieldable casing for supplying the recording medium through the first opening to the image recording apparatus and withdrawing the recording medium through the second opening after exposure and development operations in the exposure and pressure/developing stations. The recording medium has a tail end portion provided with at least two separable connection portions to be separable from remaining part of the recording medium, and a distance between the connection portions being at least equal to or larger than a length of a sheet path starting from the first opening and ending at the second opening through the exposure and pressure/developing stations.

Further, according to a method for loading the above sheet roll cartridge to the recording apparatus, said image recording apparatus comprising an exposure station and a pressure/developing station, and said sheet roll cartridge comprising, a light-shieldable casing for accommodating the recording medium, the casing being formed with first and second openings for allowing the recording medium to path therethrough; and recording medium loading means arranged in the light-shieldable casing for supplying the recording medium through the first opening to the image recording apparatus and withdrawing the recording medium through the second opening after exposure and development operations in the exposure and pressure/developing stations; the method comprising the steps of: forming at least two connecting portions at a tail end zone of the recording medium, a portion defined between the connecting portions being separable from remaining part of the recording medium along the connecting portions, and a distance between the connection portions being at least equal to or larger than a length of a sheet path starting from the first opening and ending at the second opening through the exposure and pressure/developing stations, the portion defined between the connecting portions remaining intact in the sheet path upon cutting the recording medium along the connecting portions; preparing a new sheet roll cartridge, and connecting a first leader member to a leading end of the recording medium of the new cartridge through the first opening, and connecting a second leader member to the loading means of the new cartridge through the second opening; connecting a tail end of the cut portion remaining in the sheet path to the first leader member, and connecting a leading end of the cut portion to the second leader member; and, driving the recording medium loading means to carry the consumed and following new recording mediums.

DETAILED DESCRIPTION OF THE INVENTION

Figure 1:
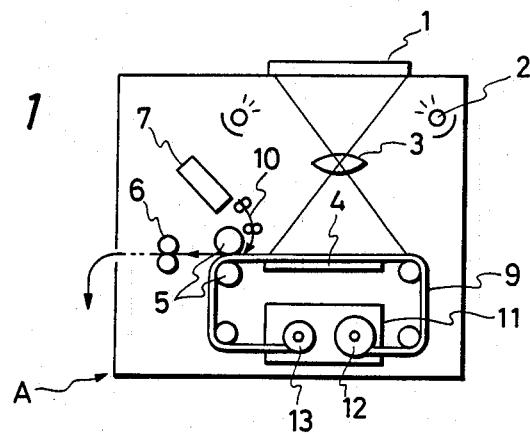
FIG. 1 is a cross-sectional view showing an image recording apparatus loaded with a sheet roll cartridge according to this invention.

FIG. 1 is a cross-sectional view showing an image recording apparatus A loaded with a sheet roll cartridge 11 according to this invention. In this embodiment, the transfer type method is applied.

Figure 2:
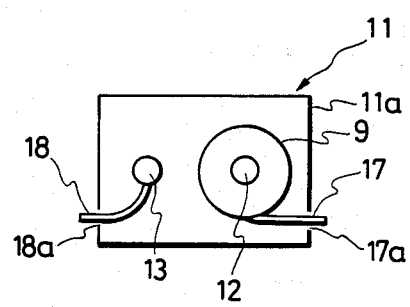
FIG. 2 is an enlarged cross-sectional view showing the sheet roll cartridge according to this invention.

The sheet roll cartridge 11 has a light-shieldable casing 11a formed with an oulet opening 17a (first opening) and an inlet opening 18a (second opening). Within the casing 11a, there are provided, as shown in FIG. 2, a recording medium loading means which includes a roll-sheet supplying shaft 12 and a roll-sheet take-up shaft 13. The roll-sheet supplying shaft 12 is positioned at the side of the outlet opening 17a and a roll-sheet take-up shaft 13 is positioned at the side of the inlet opening 18a. A roll-type microcapsule sheet 9 is wound around the shafts 12 and 13 as shown in FIG. 1 during service condition. Before service of the sheet roll cartridge, all microcapsule sheet 9 is wound over the supplying cartridge, all microcapsule sheet 9 is wound over the supplying shaft 12 as shown in FIG. 2 where a tail end of the roll sheet is in direct contact with the supplying shaft 12. At a tail end portion 9a, a pair of separable lines 20 and 21 are formed which extend in transverse direction thereof. On the other hand, a leading end of the sheet roll 9 is connected to one end of a guide leader 17 which extends through the outlet opening 17a and protrudes from the casing 11a for drawing out the recording sheet 9. (The guide leader 17 is connected to the supplying shaft 12 through the sheet roll.) Further, a take-up shaft leader 18 extends through the inlet opening 18a. One end of the leader 18 is directly connected to the take-up shaft 13 while another end of the leader 18 extends outwardly through the inlet opening 18a for taking in the recording sheet 9.

In the image recording apparatus A shown in FIG. 1, an original 1 is exposed with light from a light source 2 and a microcapsule sheet 9 mounted on an exposure stand 4 is exposed with the light reflected from the original 1 to form a latent image on the microcapsule sheet 9. At a second stage, a developmer sheet 10 is supplied from a developer sheet cassette 7, and then is overlaid on the microcapsule sheet 9 at a position upstream side of pressure/developing rollers 5. At a third stage, the developer sheet 10 and the microcapsule sheet 9 are pressed by the pressure/developing rollers 5 while they are contacted with each other, to thereby form a visible image corresponding to the latent image of the microcapsule sheet 9 on the developer sheet 10. At a final stage, the developer sheet 10 carrying the visible image thereon is calendered by heat-fixing rollers 6 and is discharged out of the image recording apparatus A, and the microcapsule sheet 9 is wound over the take-up shaft 13.

Figure 3:
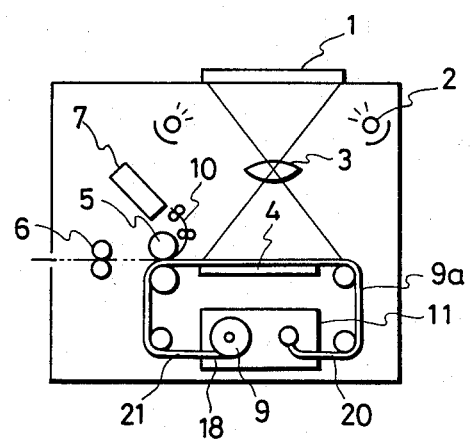
FIG. 3 is a cross-sectional view showing the image recording apparatus shown in FIG. 1 when a recording sheet in the sheet roll cartridge is consumed.

As described above, the microcapsule sheet 9 which is wound around the supplying shaft 12 is successively drawn out from the cartridge 11 and is wound around the take-up shaft 13 in correspondence with the rotation of the supplying shaft 12 and the take-up shaft 13 driven by a driving means (not shown), while the exposure, development and fixing operations as described above are repetitively conducted on the microcapsule sheet 9. FIG. 3 is a crosssectional view showing the image recording apparatus shown in FIG. 1 when the roll-type microcapsule sheet 9 is consumed. As shown in FIG. 3, the microcapsule sheet 9 at the supplying shaft 12 is completely shifted to the take-up shaft 13. The pair of separable connection portions 20 and 21 such as perforation lines or the like are formed on the tail end portion 9a of the microcapsule sheet 9. At the terminal phase of the take-up operation, this tail end portion 9a appears at the sheet path which extends from the discharge opening 17a through exposure stand 4 and pressure/developing rollers 5 to the inlet opening 18a. The distance defined between the two perforation lines 20 and 21 is beforehand set to be at least equal to or larger than the length of the sheet path, so that an operator can easily cut the sheet 9 at the perforation lines 20 and 21.

The tail end portion of the roll-type microcapsule sheet 9 remains in the sheet path by cutting the sheet along the perforation lines 20 and 21, and thereafter the consumed sheet roll cartridge 11 is removed from the image recording apparatus A. Then, a new sheet roll cartridge accommodating a new roll-type microcapsule sheet 9 is loaded to the image recording apparatus. In the new cartridge 11, the supplying shaft leader 17 having one end connected to the leading end portion of the new roll-type microcapsule sheet 9 appears from the outlet opening 17a, and the take-up shaft leader 18 having one end directly connected to the take-up shaft 13 appears from the inlet opening 18a.

With this state, another end of the take-up shaft leader 18 of the new sheet roll cartridge is connected to one end(leading end) of the tail end portion 9a of the consumed microcapsule sheet 9 remaining in the sheet path (the leading end of the tail end portion 9a is positioned close to the take-up shaft leader 18) and another end of the supplying shaft leader 17 of the new sheet roll cartridge is connected to another end(tail end) of the tail end portion 9a remaining in the sheet path (the another end of the tail end portion is positioned close to the supplying shaft leader 17). Therefore, the supplying and take-up shafts of the new sheet roll cartridge are connected to each other through the consumed microcapsule sheet 9a remaining in the sheet path in the image recording apparatus. The take-up shaft 13 is driven to perform the take-up operation of the microcapsule sheet 9 remaining in sheet path, so that the new roll-type microcapsule sheet is also drawn from the supplying shaft 12 of the sheet roll cartridge and is automatically brought into the sheet path position.

The above embodiment of the sheet roll cartridge according to this invention has a construction in which both supplying and take-up shaft are formed in a single sheet roll cartridge. However, this invention is not limited to such a construction. For example, the supplying shaft is provided in a first cartridge and the take-up shaft is provided in a second cartridge independent of the first cartridge.

A sheet roll cartridge according to this invention is provided with a roll medium having at least two separable connection portions at a tail end zone of the sheet roll, and the distance between the two connection portions is at least equal to or longer than the length of the sheet path which extends from the outlet opening of the cartridge to the inlet opening thereof through exposure portion and the development portion. Further, two leader members which extend through the openings formed in the sheet roll cartridge(s) are to be connected to both ends of the roll medium part remaining in the sheet path upon cutting along the separable connection lines, to thereby easily and accurately load the roll medium of the new roll-type microcapsule sheet to the image recording apparatus.

What is claimed is

1. A sheet roll cartridge for accommodating therein a recording medium for use in an image recording apparatus which comprises an exposure station and a pressure/developing station, said sheet roll cartridge comprising:
   a light-shieldable casing for accommodating said recording medium, said casing being formed with first and second openings for allowing said recording medium to path therethrough; and,
   recording medium loading means arranged in said light-shieldable casing for supplying said recording medium through said first opening to said image recording apparatus and withdrawing said recording medium through said second opening after exposure and development operations in said exposure and pressure/developing stations, said recording medium having a tail end portion provided with at least two separable connection portions to be separable from remaining part of said recording medium, a distance between said connection portions being at least equal to or larger than a length of a sheet path starting from said first opening and ending at said second opening through said exposure and pressure/developing stations.

2. A sheet roll cartridge as claimed in claim 1, wherein said recording medium loading means comprises a supplying shaft for supplying said recording medium through said first opening, and a take-up shaft for winding said recording medium therearound through said second opening after said exposure and development operations.

3. A sheet roll cartridge as claimed in claim 2, wherein said recording medium loading means further comprises a first leader member connected to a leading end of said recording medium roll wound over said supplying shaft, and a second leader member directly connected to said take-up shaft, said first and second leader members extending through said first and second openings, respectively.

4. A sheet roll cartridge as claimed in claim 1, wherein said recording medium roll comprises a roll-type recording sheet coated with photosensitive materials.

5. A method for loading a sheet roll cartridge on an image recording apparatus;
   said image recording apparatus comprising an exposure station and a pressure/developing station, and;
   said sheet roll cartridge comprising: a light-shieldable casing for accommodating said recording medium, said casing being formed with first and second openings for allowing said recording medium to path therethrough; and recording medium loading means arranged in said lightshieldable casing for supplying said recording medium through said first opening to said image recording apparatus and withdrawing said recording medium through said second opening after exposure and development operations in said exposure and pressure/developing stations; said method comprising the steps of:
   forming at least two separably connecting portions at a tail end zone of said recording medium, a portion defined between said connecting portions being separable from remaining part of said recording medium along said connecting portions, and a distance between said connection portions being at least equal to or larger than a length of a sheet path starting from said first opening and ending at said second opening through said exposure and pressure/developing stations, said portion defined between said connecting portions remaining intact in said sheet path upon cutting said recording medium along said connecting portions;
   preparing a new sheet roll cartridge, and connecting a first leader member to a leading end of said recording medium of said new cartridge through said first opening, and connecting a second leader member to said loading means of said new cartridge through said second opening;
   connecting at tail end of said cut portion remaining in said sheet path to said first leader member, and connecting a leading end of said cut portion to said second leader member; and,
   driving said recording medium loading means to transfer said consumed and following new recording mediums through said sheet path.

* * * * *